W. E. ELLIS.
CANDY CUTTER.
APPLICATION FILED MAY 16, 1908.
918,427.
Patented Apr. 13, 1909.
2 SHEETS—SHEET 1.
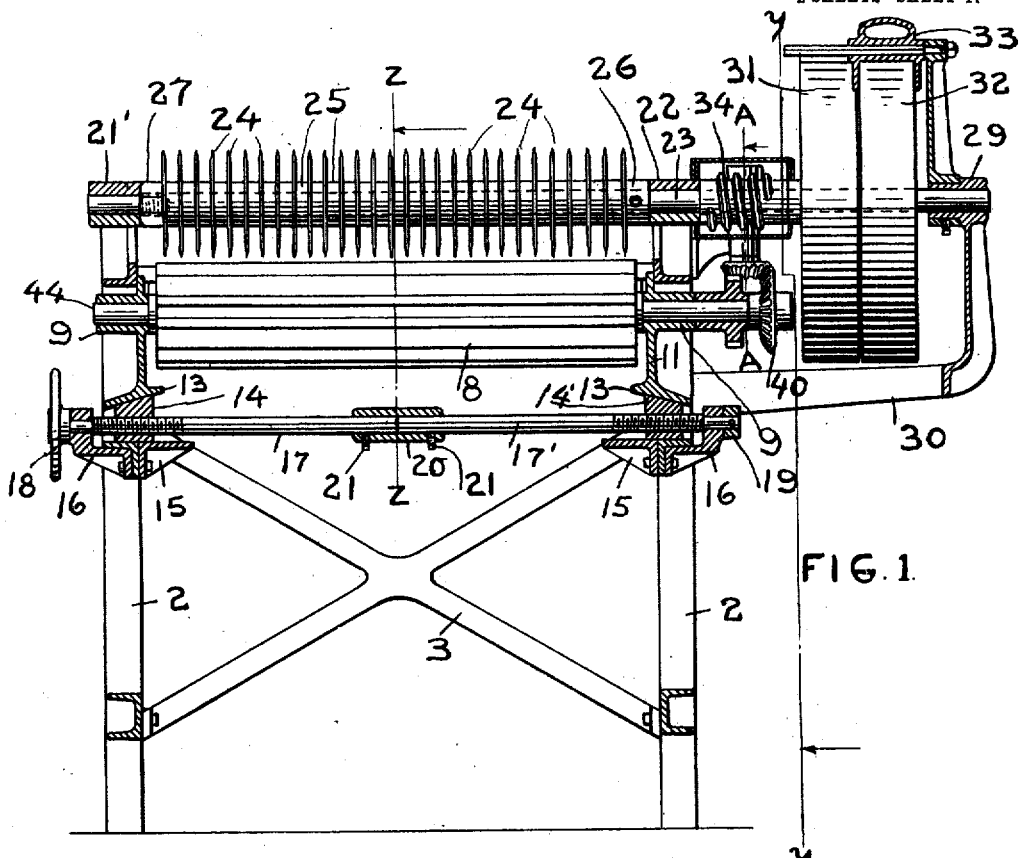
FIG. 1.
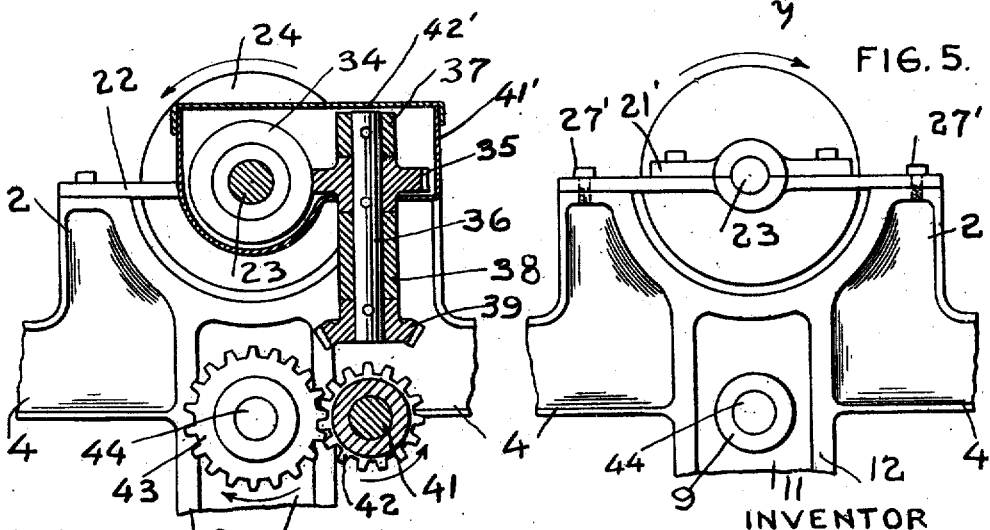
FIG. 4.
FIG. 5.
WITNESSES.
J. Jessen
H. Buck.
INVENTOR
WILLIAM E. ELLIS
BY
J. N. Beurnes
ATTORNEY.

W. E. ELLIS.
CANDY CUTTER.
APPLICATION FILED MAY 16, 1908.

918,427.

Patented Apr. 13, 1909.
2 SHEETS—SHEET 2.

WITNESSES
J. Jessen
H. Buck.

INVENTOR
WILLIAM E. ELLIS.
BY J. N. Bearnes
ATTORNEY.

UNITED STATES PATENT OFFICE.

WILLIAM E. ELLIS, OF MINNEAPOLIS, MINNESOTA.

CANDY-CUTTER.

No. 918,427.   Specification of Letters Patent.   Patented April 13, 1909.

Application filed May 16, 1908. Serial No. 433,229.

*To all whom it may concern:*

Be it known that I, WILLIAM E. ELLIS, of the city of Minneapolis, county of Hennepin, and State of Minnesota, have invented certain new and useful Improvements in Candy-Cutters, of which the following is a specification.

My invention relates to an improved machine for cutting slabs of candy or other similar articles, into rectangular units suitable for commercial uses and relates more especially to cutting a certain kind of candy known as caramel, into predetermined and uniform pieces.

The object of my invention is to provide a machine that will be more reliable in operation, and have a greater capacity than the machines heretofore in use and that will be simple of construction and easily adjusted to cut the caramel into different sizes.

Figure 2:
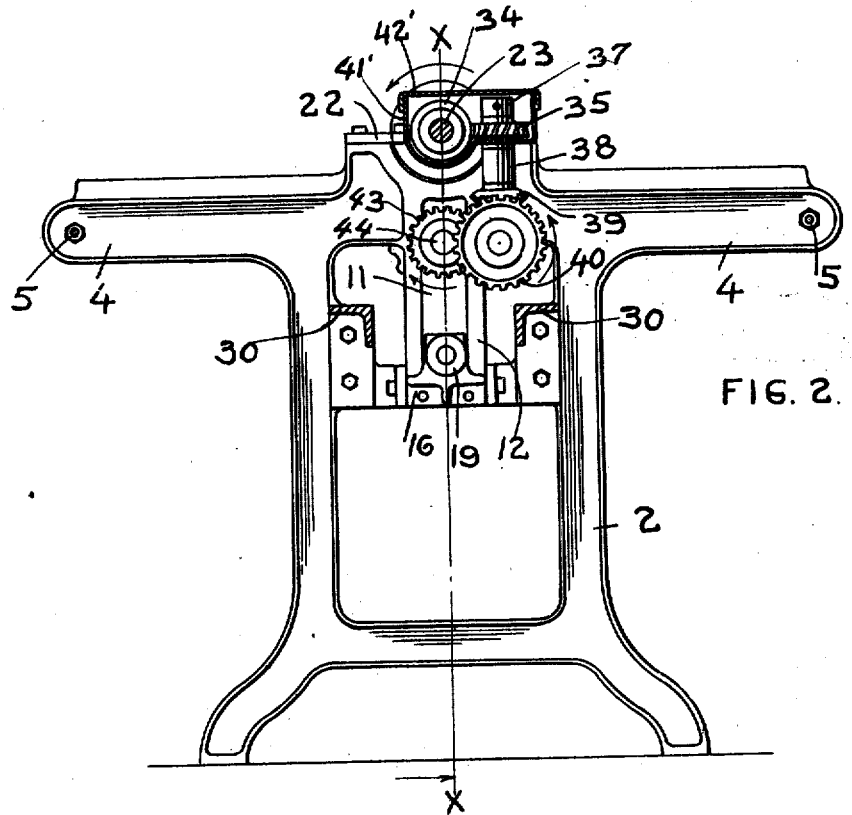
Figure 3:
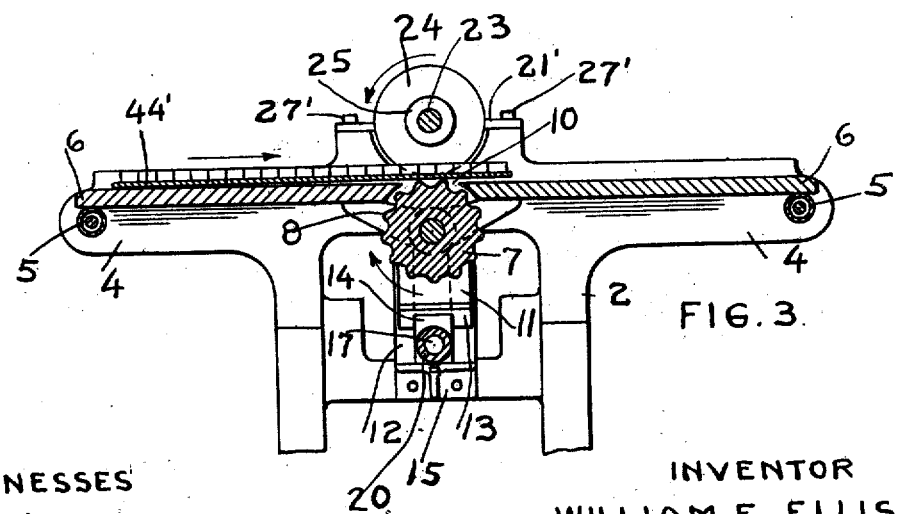

To these ends my invention consists generally, in the construction and combination of parts hereinafter described and particularly pointed out in the claims, and will be more readily understood by reference to the accompanying drawings forming a part of this specification in which, Figure 1, is a transverse vertical section on the line of X, X, of Fig. 2. Fig. 2, is a partial section and side elevation on the line of Y, Y, of Fig. 1. Fig. 3, is a sectional view taken on the line Z, Z, of Fig. 1. Fig. 4, is a vertical section taken on the line of A, A, of Fig. 1. Fig. 5, is a detail view of one of the main detachable bearings.

In the drawings 2, 2, represents the main frame of the machine securely braced together by cross-girders 3. Integral extensions, 4, 4, project in opposite directions from the main frame and are secured together by stay rods 5, 5, upon which the outer ends of the feed tables 6, 6, are supported. A feed controlling or retarding roller 7, provided with suitable corrugations 8, is centrally mounted in bearings 9, 9, and projects through the opening 10 between the tables 6, 6. The bearings 9, 9, of the roller 7, are arranged upon plates 11, 11, that slide between stationary guide bars 12. The lower ends of the plates 11, 11, have oppositely inclined faces 13, 13, that rest upon correspondingly inclined faces of adjusting blocks 14 and 14¹. These blocks are slidably supported upon brackets 15 and 16 that are rigidly fastened to the main frame. The blocks 14 and 14¹ are provided with right and left hand threaded holes and right and left hand threaded rod 17, passes through and engages the threaded portion of the blocks outside of which the rod 17 is journaled in suitable lugs projecting from the brackets 15 and 16. The rod 17 is provided at one end with a hand wheel 18, and at the other with a collar 19, which prevents endwise movement of the rod.

When adjusting the feed controlling roller in a vertical direction, the rod 17 is turned by means of the hand wheel 18. The inclined blocks 14, 14¹, will thereby be moved either away or toward each other according to the direction of the movement of the rod and each end of the roller will be correspondingly raised or lowered. For the purpose of adjusting the feed controlling roller 7, perfectly parallel to its work I prefer to make the rod 17 in two separate pieces 17 and 17¹, and join them together at the center of the machine by a long collar coupling 20, adjustably secured to the opposing ends of the two halves of the rod by set screws 21, 21. When once paralleled, the feed controlling roller will remain so when being adjusted by means of the hand wheel, 18.

Above the roller 7, and parallel therewith is mounted in bearings 21¹ and 22, a shaft 23, carrying a series of annular cutting knives 24 that are spaced equidistant apart by means of the spacing collars 25 loosely arranged on the shaft 23 and tightened firmly against the knives 24, and collar 26 by means of a threaded jam nut 27, arranged upon the cutter shaft 23. To the end that the cutter knives may be easily and quickly removed for the purpose of changing the spacing of the knives, the frame 2 is cut away in a semi-circular cavity under the bearing 21, to permit the knives being readily removed from the shaft 23 (see Fig. 5), and the bearing 21 is detachably secured to the main frame at each side of the semi-circular cut by means of screws 27¹. These may be readily removed and the bearing 21 slid off the shaft, after which the knives and collars may be removed and different spacing collars inserted to change the cut of the candy. To cut the candy efficiently and prevent its clogging between the knives, it is very essential to have a high rotative speed of the knives compared to the speed by which the candy is fed under the knives, and it is therefore necessary to provide a very slow speed of the feed controlling roller 7, relatively to the speed of the cutter knives 24. This I accomplish in a simple and compact manner as follows: Referring to Figs. 1, 2 and 4, it will be seen that the cutter shaft 23 extends through the bearing 22 and into a bearing 29 provided in a bracket 30 extending from the main frame. Between these bearings fast and loose driving pulleys 31 and 32 are mounted on the shaft 23 and a suitable belt shipper 33 is provided for the driving belt. A worm, 34 is fastened to the cutter shaft 23 near the driving pulley and engages a wormwheel 35, that is rigidly secured to a short vertical shaft 36. The shaft 36 is mounted in bearings 37 and 38 in brackets extending outward from the main frame. Below the bearings 38 the shaft carries a bevel gear 39, meshing with a larger bevel gear 40, that runs loosely upon the stud 41 and is rigidly connected to a small pinion 42, which in turn meshes with a larger spur gear 43 fastened upon the roller shaft 44. The worm gearing runs preferably in oil and I provide an oil casing 41$^1$ inclosing the worm 34 and wormwheel 35, and a cover, 42$^1$, gives access to the oil casing.

The operation of the machine is as follows: The candy in the form of large slabs is placed in one or more layers upon rectangular pieces of pasteboards 44$^1$ and is then fed in between the rapidly revolving knives and the slowly revolving corrugated retarding roller. The knives cut through the candy and slightly into the pasteboard and the candy emerges from the first operation in strips of a width corresponding to the distance between the knives after which it is returned to the head of the machine and passed through a second time at an angle of 90° which leaves it in the form of small rectangular uniform pieces. The size of these pieces may be varied by varying the spaces of the knives as heretofore described.

By reason of the great difference in the speed of the cutter knives and the retarding action of the roller 7, it is possible, with my machine to absolutely avoid the clogging and sticking of the knives and to cut the candy without flouring, the necessity of which is a serious objection to the usual machines heretofore employed for cutting caramel candy. Furthermore, by my improvements, a series of layers or slabs of candy can be placed, one on top of the other, and run through the machine at the same time which greatly enhances the capacity of the machine and which it has been impossible to accomplish heretofore.

What I claim as my invention and desire to secure by Letters Patent of the United States is—

1. The combination with a main revolving shaft and a series of annular knives spaced upon the said shaft, a worm 34 secured to the said shaft and engaging a wormwheel 35, an auxiliary shaft 36 for the said wormwheel, a bevel gear 39 carried by the said auxiliary shaft and meshing with a larger bevel gear 40, a bearing for the said bevel gear, a pinion 42, connected to the said bevel gear and meshing with a gear wheel 43 and a feed controlling roller driven by the said gear wheel substantially as described and for the purpose set forth.

2. The combination with a main revolving cutter shaft, a corrugated feed controlling roller 7, means for driving the said roller by the said cutter shaft at a greatly reduced speed, adjustable bearing plates 11, for the roller 7, the said plates being provided with opposed inclined faces 13,—13 right and left hand threaded adjusting blocks 14,—14$^1$ engaging the inclined faces 13—13 of the plates 11, right and left hand threaded rods 17 and 17$^1$, and an adjusting coupling connecting the said rods, substantially as set forth and described.

3. The combination with a slowing revolving feed controlling roller of a rapidly revolving cutter shaft, means for rotating the said roller from the said shaft, a series of annular cutting knives arranged upon the said shaft, spacing collars arranged between the said knives, a set collar and a jam nut for securing detachably the said spacing collars and the said knives upon the said shaft, a frame, a semicircular cavity in the said frame of larger radius than the knives and a detachable plate bridging the said cavity and forming one of the bearings for the cutter shaft, substantially for the purpose and as set forth and described.

4. The combination of a rapidly revolving cutter shaft 23, knives 24, spacing collars 25, set collar 26, jam nut 27, detachable bearing plate 21$^1$ and bearings 22 and 29, a feed controlling roller 7, slowly driven from the shaft 23 by means of the worm 34, wormwheel 35, shaft 36, bevel gears 39 and 40, pinion 42 and gearwheel 43, adjustable bearing plates 11, sliding adjusting blocks 14, 14$^1$, threaded adjusting rods 17 and 17$^1$ and parallel adjusting coupling 20, substantially as set forth and described.

In testimony whereof I affix my signature in presence of two witnesses.

WILLIAM E. ELLIS.

Witnesses:
WILL FOGG,
EUGENE FOGG.